P. M. LINCOLN.
ELECTRICAL DEVICE.
APPLICATION FILED JUNE 5, 1916.

1,315,975.

Patented Sept. 16, 1919.

WITNESSES:
Fred. A. Lind.
J H Procter

INVENTOR
Paul M. Lincoln
BY
Wesley G. Carr
ATTORNEY

UNITED STATES PATENT OFFICE.

PAUL M. LINCOLN, OF PITTSBURGH, PENNSYLVANIA.

ELECTRICAL DEVICE.

1,315,975.      Specification of Letters Patent.      Patented Sept. 16, 1919.

Application filed June 5, 1916. Serial No. 101,738.

*To all whom it may concern:*

Be it known that I, PAUL M. LINCOLN, a citizen of the United States, and a resident of Pittsburgh, in the county of Allegheny and State of Pennsylvania, have invented a new and useful Improvement in Electrical Devices, of which the following is a specification.

My invention relates to electrical devices and particularly to reciprocating electric motors.

The object of my invention is to provide a motor of the above indicated character that shall have a substantially uniform torque throughout its movement and shall be efficient in its operation.

My copending application Serial No. 40,534, filed July 19, 1915, discloses a timing device that is adapted to be actuated by electromagnets and to be controlled by the flow of fluid from one receptacle to another through constricted openings. Since the torque of the actuating electromagnets is not uniform throughout their movements, and since they require relatively large currents to actuate the fluid-containing receptacles, I provide a reciprocating motor comprising two oppositely disposed electromagnets having curved pole pieces that are arranged substantially in parallel with respect to each other. A pivotally-mounted core member of substantially U-shape is so disposed that its pole pieces are adapted to turn between the adjacent pole pieces of the stationary electromagnets. The windings of the stationary electromagnets are so connected to a source of electromotive force that their adjacent pole pieces are of opposite polarity, and the winding of the movable member is adapted to be so controlled by a timing mechanism that the current which traverses it is alternately reversed. The pole pieces of the stationary and movable magnetizable members may be so tapered or of such shape that the torque of the movable member may be caused to be substantially constant throughout its entire range of movement.

Figure 1:
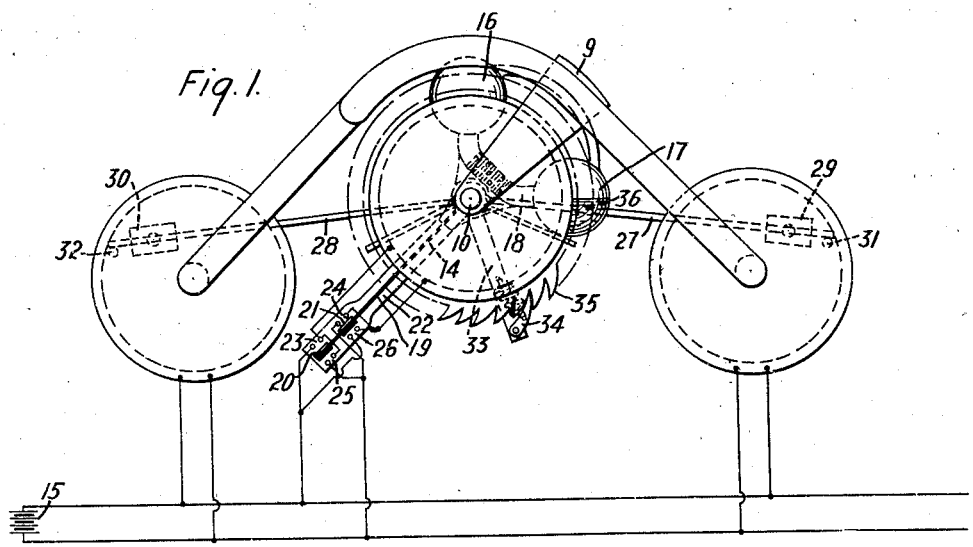
Figure 2:
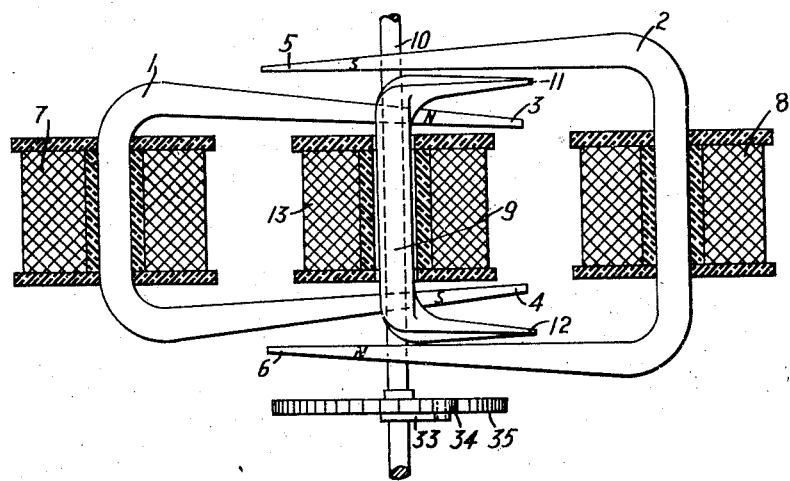

Figure 1 of the accompanying drawing is a diagrammatic side elevational view of a reciprocating motor embodying my invention, and Fig. 2 is a view, partially in plan and partially in section, of the reciprocating motor shown in Fig. 1.

Two stationary electromagnets 1 and 2 of substantially U-shape are provided with pole pieces 3 and 4 and 5 and 6, respectively, that are preferably of varying cross-sectional area but may be of uniform cross-sectional area. The electromagnets 1 and 2 are provided with energizing windings 7 and 8, respectively. The pole pieces 3, 4, 5 and 6 are adapted to be curved in shape near their outer ends and are all adapted to be disposed substantially in parallel relation with respect to each other. A U-shaped magnetizable member 9 is mounted on a shaft 10 and is preferably provided with tapering pole pieces 11 and 12 that are adapted to turn between the pole pieces 3 and 5 and 4 and 6, respectively, of the stationary magnets. While the pole pieces 11 and 12 are herein described as tapering, they may be of any other desired shape and cross-sectional area. A winding 13 is provided for inducing magnetic lines of force in the pivoted core member 9 and is adapted to be controlled by a timing mechanism 14. The windings 7 and 8 are so operatively connected to a source 15 of electromotive force that the pole pieces 3 and 5 are of opposite polarity. That is to say, if the pole piece 5 is a south pole piece, the pole 3 will be a north pole, and, consequently, the pole pieces 4 and 6 will be south and north, respectively. The pole pieces of the stationary members are curved to coöperate with the pivotally mounted magnet 9 and thus insure a uniform magnetic field. The pole pieces 11 and 12 are tapered to insure a concentration of the lines of force and thus more effective operation.

The timing device 14 comprises two receptacles 16 and 17 that are connected by a communicating tube or conduit 18 which is provided with one or more plates having relatively small openings therein. The receptacles are pivotally mounted on the shaft 10, and a resilient member 19 having two bridging contact members 20 and 21 mounted thereon is operatively connected, at one of ends, to the receptacles. An insulating member 22 is mounted on the shaft 10 in alinement with the pole pieces of the movable core member 9 and is provided with a plurality of pairs 23, 24, 25 and 26 of contact members. The pairs 23, 24, 25 and 26 of contact members are so connected to the winding 13 and to the source 15 of electromotive force that, when the bridging contact members 20 and 21 engage the pairs 23 and 24 of contact members, current will traverse the winding 13 in one direction, and when they engage the pairs 25 and 26 of contact members, current will traverse the winding 13 in the opposite direction.

Two lever arms 27 and 28 having weight members 29 and 30, respectively, near their outer ends, are loosely mounted on the shaft 10. The outer ends of the arms 27 and 28 are adapted to normally rest on stationary pins 31 and 32. A lever arm 33, that is provided with a spring-restrained pawl 34, is mounted on the shaft 10, and the pawl is adapted to engage a ratchet wheel 35 which is loosely mounted on the shaft 10. Thus, when the movable core member 9 oscillates, the ratchet wheel 35 will be moved a predetermined distance in a time that is controlled by the timing device 14. The ratchet wheel 35 may be operatively connected, through any form of gearing, to an indicating device (not shown) for the purpose of indicating the lapse of time.

Assuming that the movable core member 9 has moved to the position shown in the drawing, the fluid 36 within the receptacle 16 has not had sufficient time to traverse the tube 18 to the receptacle 17, and the receptacle 17 engages one arm of the lever 28, when sufficient time has elapsed to permit the fluid to pass from the receptacle 16 to the receptacle 17, the increased weight of the receptacle 17 will raise the weight member 30 to permit the bridging contact members 20 and 21 to engage the pairs 23 and 24 of contact members. Current will traverse the winding 13 in such direction that the pole pieces 11 and 12 will become south and north poles, respectively. Thus, the pole pieces 11 and 5 and 12 and 6 will repel each other by a gradually decreasing amount and the pole pieces 11 and 3 and 12 and 4 will attract each other by a gradually increasing amount to cause the movable member 9 and the timing device 14 to move in a counter-clockwise direction, with a uniform torque, and the ratchet wheel 25 to be turned an amount proportional to the movement of the member 9. After the timing device 14 has been turned, the fluid in the receptacle 17 will traverse the tube or conduit 18 to the receptacle 16, and, after a predetermined time that is controlled by the time required for the fluid to traverse the tube 18, the contact members 20 and 21 will engage the pairs 25 and 26 of contact members. When the contact members are so engaged, current will traverse the winding 13 in such direction that the pole pieces 11 and 12 will be north and south, respectively. Thus, the movable member 9 will move with a substantially constant torque in a clockwise direction to actuate the ratchet wheel 35. From the above description it will be seen that the pole pieces of the electromagnets are so shaped and disposed with respect to each other that the movable poles continually recede from one of the pairs of stationary pole pieces and continually approach the other pair.

By changing the size and the number of the constricted openings in the plates that are disposed in the tube or conduit 18 and by adjusting the position of the weight members 29 and 30 on the lever arms 27 and 28, the time of operation of the movable member 9 may be easily varied.

I do not limit my invention to the particular device illustrated, as many modifications may be made therein without departing from the spirit and scope of the invention as set forth in the appended claims.

I claim as my invention:

1. A reciprocating motor comprising two stationary magnetizable members each having curved pole pieces that are arranged in pairs, means for inducing magnetic lines of flux in the said members in opposite directions, a pivotally mounted magnetizable member having pole pieces that are disposed between the pole pieces of the pairs and a winding for the pivotally mounted member.

2. A reciprocating motor comprising two stationary electromagnets each having curved pole pieces that are all disposed substantially parallel with respect to each other and arranged adjacent to each other to constitute pairs, and an electromagnet having a pivotally mounted core member the pole pieces of which are adapted to be disposed between the adjacent pole pieces of the respective pairs.

3. A reciprocating motor comprising two stationary electromagnets each having curved pole pieces of varying cross-sectional area that are all disposed substantially parallel with respect to each other and arranged adjacent to each other to constitute pairs, and an electromagnet having a pivotally mounted core member the pole pieces of which are adapted to be disposed between the adjacent pole pieces of the respective pairs.

4. A reciprocating motor comprising two stationary electromagnets each having pole pieces that are all disposed substantially parallel with respect to each other and arranged adjacent to each other to constitute pairs, and an electromagnet having a pivotally-mounted core member of U-shape the poles of which are adapted to be disposed between the adjacent pole pieces of the respective pairs.

5. A reciprocating motor comprising two stationary electromagnets each having curved pole pieces that are all disposed substantially parallel with respect to each other and arranged adjacent to each other to constitute pairs, and an electromagnet having a pivotally-mounted core member of U-shape the pole pieces of which are adapted to turn between the adjacent pole pieces of the stationary electromagnets.

6. A reciprocating motor comprising two stationary electromagnets each having pole pieces that are curved and all disposed in parallel relation with respect to each other and arranged adjacent to each other in pairs, and a pivotally mounted electromagnet having pole pieces that are adapted to turn between the adjacent pole pieces of the stationary electromagnets.

7. A reciprocating motor comprising two stationary electromagnets each having curved pole pieces the poles of which are all disposed substantially parallel with respect to each other and arranged adjacent to each other in pairs, and a movable magnetizable armature having pole pieces that are disposed between the adjacent pole pieces of the stationary electromagnets.

8. A reciprocating motor comprising two stationary magnets each having pole pieces the poles of which are all disposed substantially parallel with respect to each other and arranged adjacent to each other in pairs, and a magnetizable member having pole pieces that are adapted to turn between the adjacent pole pieces of the stationary magnets.

In testimony whereof, I have hereunto subscribed my name this 29 day of May 1916.

PAUL M. LINCOLN.